United States Patent [19]

Nakashima

[11] 3,722,755
[45] Mar. 27, 1973

[54] APPARATUS FOR AUTOMATICALLY FILLING A PRE-DETERMINED AMOUNT OF POWDERED GRAIN SUBSTANCE

[76] Inventor: Shigeo Nakashima, 7-7, Koaza Tenjinmori, Oaza Morimoto, Mukomachi, Otokuni-gun, Kyoto-fu, Japan

[22] Filed: Sept. 11, 1970

[21] Appl. No.: 71,506

[30] Foreign Application Priority Data

Jan. 31, 1970 Japan .................................. 45/8632
Nov. 15, 1969 Japan ................................ 44/91507

[52] U.S. Cl. ............... 222/193, 222/201, 222/227, 222/413
[51] Int. Cl. ............................................. B65d 83/06
[58] Field of Search......222/193, 227, 203, 201, 413, 222/271, 272, 263

[56] References Cited

UNITED STATES PATENTS

| | | | |
|---|---|---|---|
| 1,593,517 | 7/1926 | Tharrington | 222/145 UX |
| 2,065,079 | 12/1936 | Lauterbur | 222/193 X |
| 2,260,302 | 10/1941 | Driscoll et al. | 222/413 |
| 2,818,200 | 12/1957 | Webb et al. | 222/203 X |
| 2,946,357 | 7/1960 | Hobbie et al. | 222/193 X |
| 1,128,043 | 2/1915 | Quigley | 222/413 UX |
| 3,473,702 | 10/1969 | Molitor | 222/203 |
| 3,330,064 | 7/1967 | Roubal | 222/193 |

FOREIGN PATENTS OR APPLICATIONS 141,142    11/1959    U.S.S.R. ............................... 222/272

*Primary Examiner*—Robert B. Reeves
*Assistant Examiner*—John P. Shannon
*Attorney*—Kurt Kelman

[57] ABSTRACT

Apparatus for automatically filling a pre-determined amount of powdered granular material into a bag. The apparatus comprises a screw feeder provided within a tubular conveyor case, the walls of which are flexible. A smooth transfer of powder is effected by vibrating the walls of the conveyor case. In addition, to transfer the substance from the conveyor a pulsed compressed air stream is jetted at the substance being transferred near the other end of the conveyor case. Within the conveyor case are provided a mixing chamber, and a supply tube connected to measuring apparatus via a flexible tube, so that when a pre-determined amount of powdered material is filled in the bag, the filling operation automatically comes to a stop.

5 Claims, 4 Drawing Figures

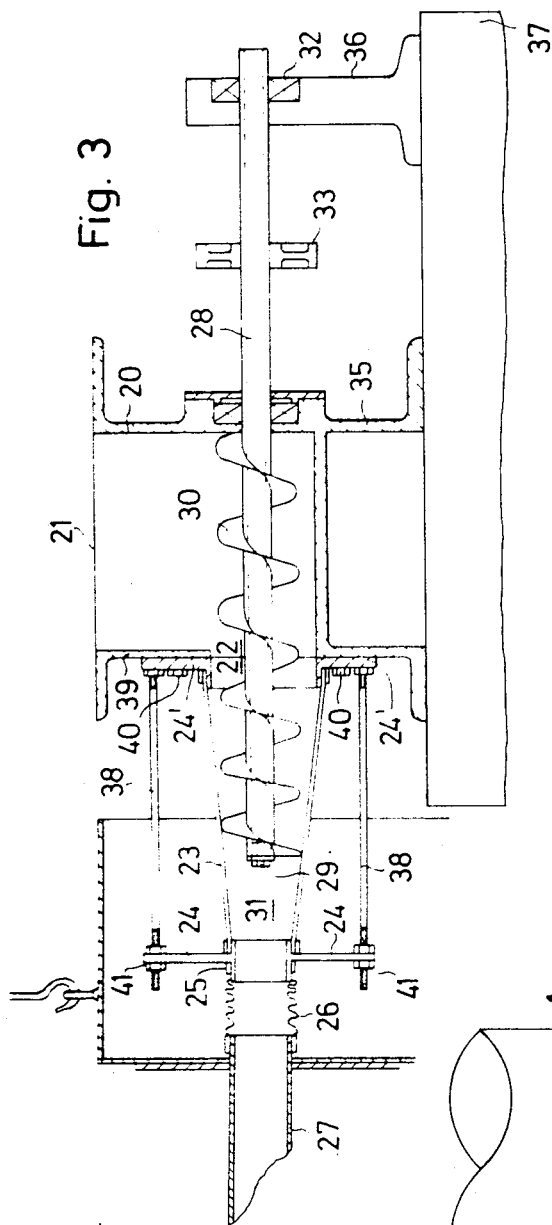

APPARATUS FOR AUTOMATICALLY FILLING A PRE-DETERMINED AMOUNT OF POWDERED GRAIN SUBSTANCE

The present invention is related to an apparatus for automatically filling a pre-determined amount of powdered grain substance.

More particularly the present invention is related to an apparatus essentially comprising a screw-feeder provided within a tubular conveyor case, the walls of which are made of flexible tubes such as rubber so that a smooth transfer of powdered grain substance after de-airing processing is effected by means of screw feeder within the conveyor case, the walls of the case being vibrated incessantly to transfer the substance without sticking to the walls, and the compressed air stream in pulses being jetted at the substance being transferred near the other end of the conveyor case. Within the conveyor case are provided a mixing chamber in a shape of a trumpet, a supply tube connected to measuring portion via a flexible tube so that when a pre-determined amount of powdered grain substance is filled in a packing bag, the filling operation automatically comes to a stop.

The present invention is further described in relation to one embodiment thereof and reference being made to attached drawings in which;

FIG. 2 is a cross-sectional view along lines A—A of FIG. 1,

FIG. 3 is an enlarged view of the feeder part of FIG. 1, and

FIG. 4 is a cross-sectional view of the feeder part of another embodiment according to the present invention.

Figure 1:
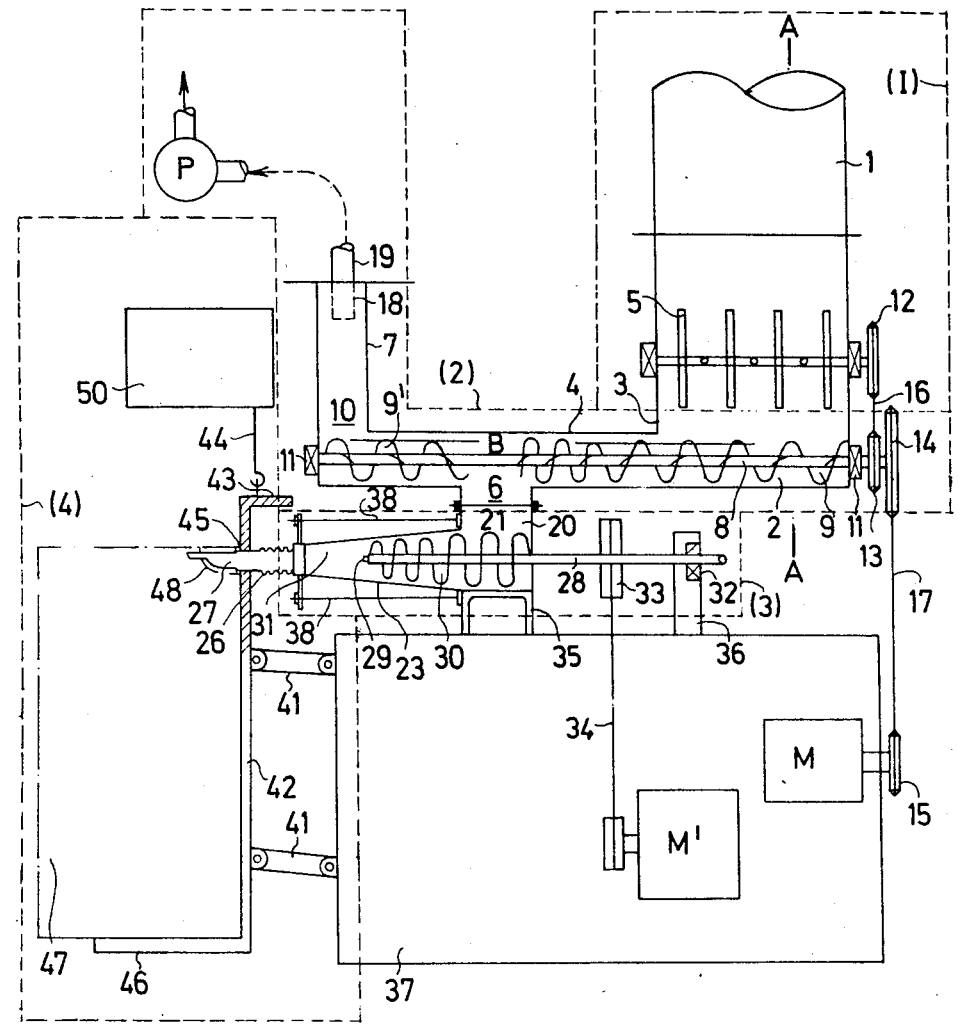
FIG. 1 is an explanatory drawing of one embodiment of the present invention.

More in detail, the apparatus of the present invention comprises a hopper(1) de-airing means(2), the pressure feeding part(3) and measuring part(4).

1. Hopper

In FIG. 1, 1 is a tank tapered toward the semi-circular arc shaped bottom part 2, one side 3 of the bottom part being opened and connected to a horizontal tubular screw- conveyor case 4(hereinafter referred to as a conveyor case). FIG. 2 is a cross-sectional view of FIG. 1 along the line A—A in which 5 denotes an agitating rod within the tank.

2. De-airing means

De-airing means is shown in FIG. 1 by the dotted line wherein a separating chamber B is provided suitably inside the conveyor case 4 connected to the bottom part 2 of the tank. The lower part thereof is opened to be connected to supply chamber outlet 6. A duct 7 is provided at one end of the conveyor case 4 opened upwardly. 8 denotes a shaft for screw conveyors 9, 9', provided fixedly with screws for the distance from bottom part 2 of the tank to the separating chamber B and from separating chamber B to one end 10 of the conveyor case 4, axially along the shaft but in such a way that the facing screws move in opposite directions from each other. That is to say, the blades of the each of conveyors 9, 9' are turned in the opposite direction. Screw conveyor 9 is pitched in a successive diminuition toward its end in the direction of the separating chamber B. 11, 11 denote bearings for the shaft 8 of the screw conveyor. 12, 13 respectively are chain wheels fixed to the agitating rod 5 and to the shaft 8 of the screw conveyor and 14, 15 are also chain wheels fixed to the shaft 8 of the screw conveyor and a motor M. 16, 17 denote chains. The duct 7 is connected to the open air either directly or via de-airing fan with a duct tube 19 having a filter 18 connected to the end thereof.

3. The Pressure Feeding Part

The pressure feeding part is shown in an enlarged explanatory view in FIG. 3 in which 20 is a pressure feeder case connected to the bottom part of the supply chamber outlet 6, 21 an inlet and 22 an outlet thereof respectively. A cylinder 23 made of a soft material and flanges 24, 24', 24, 24' supported by stay boards 38 are connected to the side 39 of the transfer case 20 by bolts 40 in one body, the tension of the cylinder 23 having been adjusted preliminarily by nuts 41 at one ends of stay boards 38. A flange for the rigid cylindrical tube 25 provided in the center of the flange 24, a filling tube 27 and a flexible tube 2 are connected to the end of the cylinder 23. 28 is a hollow shaft with a nozzle 29 at one end. A screw feeder 30 is provided through the compressure feeder case 20 and the cylinder 23 on the outer circumference of the shaft and in a successive dimunition toward one end of the shaft, thereby forming a trumpet shaped mixing chamber 31 in the space at the end of the cylinder 23 and between the end of the shaft 28 and the cylindrical tube 25. Another end of the shaft 28(in the opposite direction of the nozzle 29) is supported by a bearing 32 and is connected to the compressed air source(not shown in the drawings). Pulley 33 fixed to the shaft 28 transmits rotation from the motor M' via a belt 34 to rotate the screw feeder 30. 35 denoets a leg of the compression feeder case 20, 36 a support for the bearing 32 and 37 a base respectively.

4. Measuring Part

Measuring part consists of a measuring apparatus 50 and a measuring frame 42 connected to the base 37 by way of two parallel arms 41, 41 of the mechanism in such a way as to be freely movable in a vertical direction. The measuring apparatus 50 and the upper face 43 of the measuring frame 42 are connected in a scale via hanging rod 44. The filling tube 27 is connected through said frame 42 with its base 45 fixed to frame in a body.

Now the present invention will be described referring to the operation and the effects thereof;

Powder grain substance poured into the tank 1 is fed uniformly to the screw conveyor 9 provided at the base 2 by rotation of the agitating rod 5. The powdered substance is fed forwardly toward the separating room B within the transfer case 4 from the base 2 of the tank by rotating conveyor 9.

Since the screw conveyor 9 is pitched in successive dimunition toward its end, the volume of the powdered substance as it proceeds with the transfer case 4 is compressed, the air being pressed out, and reaches the separating room B to be induced to the supply chamber outlet 6. The air is lead through the separating chamber B, the transfer case 4 and de-airing duct through the filter 18 to the out of the apparatus. In some cases, the air is forced out further through a duct tube 19 having the filter 18 at the end of the duct 7 by the fan P. When a part of the powdered substance pressed into the separating room by the screw conveyor 9 within the transfer case 4 happens to go toward the screw conveyor 9' beyond the separating room B, the said part of the powdered substance is pushed back toward the separating chamber by the rotation of the screw conveyor 9' to be induced with the compressed powdered substance from the direction of screw conveyor 9. Thus the air stream from the separating chamber toward left is allowed to pass through the separating room B while the stream of the powdered substance is pushed back into the separating room B by the rotation of the banks of the conveyor 9'. The completely de-aired powdered substance is now guided to the inlet 21 of the feed part from the supply chamber outlet 6.

The powdered grain substance is further transfered into the cylinder 23 via the inlet 21 and the outlet 22 of the feeder case by the rotation of the screw feeder 30 provided in the bottom of the feeder case 20. The volume of the substance within the cylinder is compressed and changed by means of the screw feeder 30 pitched in successive diminution to be transferred to the funnel shaped mixing chamber 31 at the end of the cylinder 23. The powdered substance is then admixed within said chamber by the compressed air stream being jetted from the nozzle 29 and filled to the bag 47 on the bag stand 46 fixedly provided at the bottom of the measuring frame 42 via the cylinderical tube 25, the flexible tube 26 and to the filling tube 27.

The weight of the filled bag falls on the measuring frame 42 and is transmitted to the measuring apparatus 50 via the hanging rod 44 with a fine movement of the frame.

In the present invention, the compressed air stream is jetted from said nozzle 29 intermittently in pulses in order to fill the bag with high density. In the conventional method, a mixture of air and solid was jetted out of the filling tube at a high speed, whereas the present invention facilitates high density filling by the pulse movement of the compressed air stream at a certain interval. Moreover, the pulse movement of the compressed air stream presents a phenomenon wherein an air column in the space leading from the mixing chamber 31 → the filling tube 27 → the bag 47 resonates with said pulse air current in jet to form a cavity, a separation or an exfoliation like a super sonic wave. Accordingly, the particles of the powdered grain substance never stick to the inner walls of the tube, the bag 47, etc. contacting with said spaces, facilitating an efficient filling. This is the same effect obtained in the manual operation wherein the powder substances sticking to the inner side of the bag or the tube is beaten by sticks or given a fine vibrating movement.

In the aforementioned case, when the powdered substance is pressed forwardly into the cylinder 23 by the use of the screw feeder 30 and fluidized, accelerated and pressurized by the jet stream of compressed air from the jet nozzle 29 for filling the bag 47, the powdered substance inclines to be pressed back in the screw feeder 30 and the cylinder 23 by the backpressure of the reaction. In order to press the powdered substance in resistance to the back pressure, it is usually contrived to utilize the material seal effects in de-air state, that is to sufficiently compress the powdered substance in the cylinder 23 and to heighten the density thereof. However, material seal effect is not seen in the case when the powdered substance fed to the screw feeder 30 is the substance containing air and having high fluidity, lowering the compression effect of the screw feeder. This is generally known to be caused by the presence of air particles among the powdered substance acting as a lubricant and deteriorating the compression effectiveness. This phenomenon becomes more remarkable as the density of the air becomes higher, thereby increasing the filling hour and deteriorating work efficiency in packing. It is, therefore, desirable for material sealing by the screw feeder that the powdered substance to be supplied to the screw feeder is de-aired and have a low air density. This is proceed by the effects seen in the instance wherein the substance which have been stocked in a silo for a set period of time and thus naturally have been de-aired is fed to the screw feeder.

The cycle of the pulse of compressed air stream, the width of the pulse are suitably arranged taking the physical factors of the powdered grain substance into account.

The powdered substance reaches cylinder 23 from the outlet 22 of the feeder case 20 and is compressedly fed forward within the cylinder 23 made of soft materials such as antiabrasive rubber, fine silicon processed nylon net and tensioned by stay board 38.

The compressed powdered substance exerts its pressure on the inner surface of the cylinder 23 to expand and inflate the soft cylinder 23 so that the cylinder vibrates itself, and it moves forward along the space between the screw feeder 30 and the inner surface of the cylinder 23. The result is that the powdered grain substance does not stick to the inner surface of the cylinder but moves forward efficiently.

The multiple effect of items (2), (3), namely the jetting of compressed air stream in pulses from the jet nozzle 29 of the hollow shaft 28 and the rotation of the screw feeder in the cylinder 23 made of soft and flexible material, is that every kind of powdered substance can be fed forwardly smoothly and efficiently. This is the most remarkable characteristic of the present invention which can be utilized in transfers of every kind of powdered substance, not being limited to the above embodiment of feeding process of the powdered substance to an apparatus for automatically filling the predetermined amount into a bag. In the conventional type cylinders of metallic type, such sticky powdered grain substances as dextrose, alpha-dextrin, synthetic meat powders and the like stick and pile between the screw feeder and the inner surface of the cylinder until the substance closes the cylinder and stops the rotation of the screw feeders very often.

Fluidizing, accelerating and pressurizing the powdered substance by sending the substance forward by the screw feeder 30 and jetting the compressed air stream by the jet nozzle 29 in the mixing chamber 31, as discussed in section (2) means sending the air into the powder which is contrary to the the de-airing operation discussed in section (1). This step of imparting fluidity to the powdered substance and accelerating and pressurizing the same simultaneously is an essential means in measuring, filling and packing the powdered substance using a filling tube having a limited diameter mouth and without damaging the accuracy in measurement.

The characteristics of the present invention is best seen in the high precision and high speed filling of an automatic filling apparatus of a pre-determined amount into a bag wherein the screw feeder for compressed feeding characterized in the above manner is given an efficient de-airing process with de-airing means 2 and it feeds the powdered substance to the bag 47 set on the bag stand 46 connected to the measuring apparatus 50 by the filling tube 27 via flexible tube 26 connected to the cylinder 23.

When filling the bag with the powdered substance from the end of the filling tube into the bag 47, the bag stand 46 and the filling tube 45 are connected to the measuring apparatus 50.

The powdered substance is measured as it is being fed into the bag 47 from the filling tube 27, which is inserted into and is contacting with the filling hole 48 of the bag 47 on the bagstand 46. Further the tube is connected to the cylinder 23 and the mixing chamber 31 via said flexible tube 26. Thus, the accurate measuring is maintained in the apparatus for automatically filling a predetermined amount causing no error in the measured amount.

What we claim is,

1. An apparatus for automatically bag filling a predetermined weight amount of powdered substance, said apparatus comprising in combination, a powdered substance supply hopper, de-airing means, said de-airing means having a first screw conveyor for transfer of powdered substance from said hopper to a discharge chamber, a second screw conveyor oppositely disposed to said chamber and having screw blades rotating opposite said first screw conveyor for pushing powdered substance toward said chamber, and a de-airing duct for exhausting air from said first conveyor, said first screw conveyor being pitched in successive diminution toward its discharge end, pressure feeding means having screw feeding means for receiving powered substance from the said chamber and for transferring same to a tapered flexible mixing chamber, said screw feeding means having a hollow shaft for transfer of pulses of compressed air to the mixing chamber, a weight measuring means comprising a weight indicator, a bag support in communication with said weight indicator, and a bag for receiving powdered substance by means of a discharge nozzle, said discharge nozzle being connected to said tapered flexible mixing chamber by means of a flexible tube.

2. The apparatus of claim 1, wherein means are included for maintaining the walls of said mixing chamber under tension.

3. The apparatus of claim 1, wherein said screw feeding means is partly disposed within the tapered flexible mixing chamber.

4. The apparatus of claim 1, wherein screw conveyors of the de-airing means are substantially horizontally disposed and are co-axially mounted on a shaft.

5. The apparatus of claim 1, wherein filter means are included in said de-airing duct for exhausting air.

* * * * *